United States Patent
Byrne et al.

(10) Patent No.: US 9,312,673 B2
(45) Date of Patent: Apr. 12, 2016

(54) LOW VOLTAGE POWER RECEPTACLE

(71) Applicants: Norman R. Byrne, Ada, MI (US);
Daniel P. Byrne, Lowell, MI (US);
Randell E. Pate, Jenison, MI (US);
Gerald N. Vander Till, Grandville, MI (US)

(72) Inventors: Norman R. Byrne, Ada, MI (US);
Daniel P. Byrne, Lowell, MI (US);
Randell E. Pate, Jenison, MI (US);
Gerald N. Vander Till, Grandville, MI (US)

( * ) Notice: Subject to any disclaimer, the term of this patent is extended or adjusted under 35 U.S.C. 154(b) by 0 days.

(21) Appl. No.: 14/293,198

(22) Filed: Jun. 2, 2014

(65) Prior Publication Data

US 2014/0355231 A1 Dec. 4, 2014

Related U.S. Application Data

(60) Provisional application No. 61/830,239, filed on Jun. 3, 2013.

(51) Int. Cl.
*H05K 5/00* (2006.01)
*H02G 3/12* (2006.01)
*H02G 3/18* (2006.01)

(52) U.S. Cl.
CPC . *H02G 3/12* (2013.01); *H02G 3/185* (2013.01)

(58) Field of Classification Search
CPC ........ H01R 13/40; H01R 13/44; H01R 13/60; H01R 13/72; H01R 25/00; H02J 7/00; H02B 1/00; H02B 1/40
USPC ............... 361/756, 641, 679.01, 690; 439/79, 439/120, 107, 131, 208, 628, 501, 660, 439/535; 320/102, 111; 307/11
See application file for complete search history.

(56) References Cited

U.S. PATENT DOCUMENTS

| | | | | |
|---|---|---|---|---|
| 3,857,044 A | * | 12/1974 | Papoi | H05K 7/1432 307/9.1 |
| 5,129,842 A | * | 7/1992 | Morgan | H01R 13/73 439/532 |
| 5,281,155 A | * | 1/1994 | Comerci | H01R 13/6666 361/212 |
| 6,220,880 B1 | * | 4/2001 | Lee | H01R 25/003 439/214 |
| D472,213 S | | 3/2003 | Byrne | |

(Continued)

FOREIGN PATENT DOCUMENTS

| | | |
|---|---|---|
| GB | 2240669 | 7/1991 |
| GB | 2119703 | 7/1998 |
| JP | 2009-247161 | 10/2009 |

OTHER PUBLICATIONS

International Search Report and Written Opinion for corresponding PCT Application No. PCT/US2014/040472, mailed Sep. 25, 2014.

*Primary Examiner* — Xiaoliang Chen
(74) *Attorney, Agent, or Firm* — Gardner, Linn, Burkhart & Flory, LLP

(57) ABSTRACT

A low voltage power receptacle assembly is adapted for providing access to low voltage power in compact spaces. The low voltage power receptacle assembly includes a circuit subassembly that is operable to transform a line voltage input, such as about 110V to 220V AC, to a lower voltage output, such as about 2V to 12V DC. Electrical input conductors receive and convey the line voltage from a power source to the circuit subassembly, while electrical output conductors convey the lower voltage output from the circuit subassembly to a low voltage power receptacle that may be spaced some distance from the circuit subassembly. The low voltage power receptacle is mountable in different housings, faceplates, and the like, to accommodate different mounting styles and locations.

15 Claims, 14 Drawing Sheets

(56) References Cited

U.S. PATENT DOCUMENTS

| | | | |
|---|---|---|---|
| 6,547,588 B1 * | 4/2003 | Hsu | H01R 13/518 439/532 |
| 6,581,834 B2 | 6/2003 | Chien | |
| 6,617,511 B2 | 9/2003 | Schultz et al. | |
| 6,782,617 B2 * | 8/2004 | Pulizzi | H01R 13/743 29/825 |
| 6,824,422 B2 | 11/2004 | Huang | |
| 6,830,477 B2 * | 12/2004 | Vander Vorste | H01R 13/743 439/214 |
| 6,908,324 B1 | 6/2005 | Morley et al. | |
| 6,932,624 B1 | 8/2005 | Hoopes et al. | |
| 6,979,205 B2 | 12/2005 | Hoopes et al. | |
| 7,018,242 B2 * | 3/2006 | Brown | H01R 31/06 439/676 |
| 7,094,077 B1 * | 8/2006 | Chen | H01R 25/142 439/118 |
| D535,257 S | 1/2007 | Byrne | |
| D537,785 S * | 3/2007 | Pincek | D13/139.4 |
| 7,201,589 B2 | 4/2007 | Jong | |
| 7,275,947 B2 | 10/2007 | Hartel et al. | |
| 7,347,744 B2 * | 3/2008 | Tabata | H01R 13/514 439/289 |
| 7,438,566 B2 | 10/2008 | Chen | |
| D583,762 S | 12/2008 | Gershfeld | |
| D585,379 S | 1/2009 | Gershfeld | |
| 7,488,204 B2 | 2/2009 | Hsu | |
| 7,544,071 B2 | 6/2009 | Jong | |
| 7,557,309 B2 * | 7/2009 | Ross | H01R 25/142 174/101 |
| 7,559,795 B2 * | 7/2009 | Byrne | H01R 31/06 439/536 |
| 7,661,966 B2 * | 2/2010 | Ohanesian | H01R 25/142 439/120 |
| D626,069 S | 10/2010 | Byrne | |
| D626,070 S | 10/2010 | Byrne | |
| 7,833,027 B2 | 11/2010 | Jong | |
| D639,244 S | 6/2011 | Byrne | |
| 8,002,586 B2 | 8/2011 | Fleisig | |
| 8,002,587 B2 | 8/2011 | Fleisig | |
| 8,016,611 B2 | 9/2011 | Fleisig | |
| 8,026,633 B2 | 9/2011 | Fleisig et al. | |
| 8,033,867 B1 * | 10/2011 | Kessler | H01R 25/003 439/652 |
| 8,043,116 B2 * | 10/2011 | Liao | H01R 13/60 439/535 |
| D649,514 S | 11/2011 | Byrne | |
| 8,061,864 B2 * | 11/2011 | Metcalf | A47B 21/00 307/150 |
| 8,158,883 B2 | 4/2012 | Soffer | |
| 8,159,085 B2 | 4/2012 | Fleisig | |
| D660,237 S | 5/2012 | Byrne | |
| 8,172,604 B2 | 5/2012 | Byrne | |
| 8,174,147 B2 * | 5/2012 | Fleisig | H01R 13/72 174/493 |
| 8,180,945 B2 * | 5/2012 | Kakish | G06F 13/4045 710/300 |
| 8,193,658 B2 | 6/2012 | Fleisig | |
| 8,207,627 B2 * | 6/2012 | Aldag | H01R 25/142 307/12 |
| 8,217,528 B2 | 7/2012 | Fleisig | |
| 8,221,158 B2 | 7/2012 | Liao | |
| D665,355 S | 8/2012 | Byrne | |
| D666,556 S | 9/2012 | Byrne | |
| 8,295,036 B2 * | 10/2012 | Byrne | H01R 25/003 174/57 |
| 8,444,432 B2 * | 5/2013 | Byrne | H01R 13/514 439/540.1 |
| 8,480,429 B2 | 7/2013 | Byrne | |
| 8,616,901 B2 * | 12/2013 | Shindo | H01R 12/724 439/540.1 |
| 8,736,106 B2 | 5/2014 | Byrne et al. | |
| 8,758,031 B2 * | 6/2014 | Cheng | H05K 5/02 439/107 |
| 2003/0032313 A1 * | 2/2003 | Kojima | H01R 23/6873 439/79 |
| 2003/0117104 A1 | 6/2003 | Liao | |
| 2003/0176100 A1 * | 9/2003 | Yurek | H01R 27/00 439/535 |
| 2003/0186582 A1 * | 10/2003 | Laukhuf | H01R 27/02 439/535 |
| 2008/0194151 A1 * | 8/2008 | Gleissner | H01R 13/652 439/660 |
| 2008/0200050 A1 * | 8/2008 | Byrne | H02G 3/185 439/131 |
| 2009/0289596 A1 * | 11/2009 | McGinley | H02J 7/0042 320/111 |
| 2010/0090531 A1 | 4/2010 | Mahaffey | |
| 2010/0317223 A1 | 12/2010 | Byrne | |
| 2011/0003505 A1 | 1/2011 | Greig et al. | |
| 2011/0009003 A1 * | 1/2011 | Youssefi-Shams | H01R 13/44 439/628 |
| 2011/0076880 A1 * | 3/2011 | Fleisig | H01R 13/72 439/501 |
| 2011/0084660 A1 * | 4/2011 | McSweyn | H01R 13/6675 320/111 |
| 2011/0104945 A1 * | 5/2011 | Gao | H01R 13/741 439/607.01 |
| 2012/0009820 A1 * | 1/2012 | Byrne | H02G 3/0437 439/625 |
| 2012/0091798 A1 | 4/2012 | Fleisig | |
| 2012/0200989 A1 * | 8/2012 | Byrne | H01R 35/04 361/641 |
| 2013/0051080 A1 | 2/2013 | Van Der Linde et al. | |
| 2013/0200841 A1 * | 8/2013 | Farkas | H02J 7/0042 320/107 |
| 2013/0244475 A1 † | 9/2013 | Sayadi et al. | |

\* cited by examiner
† cited by third party

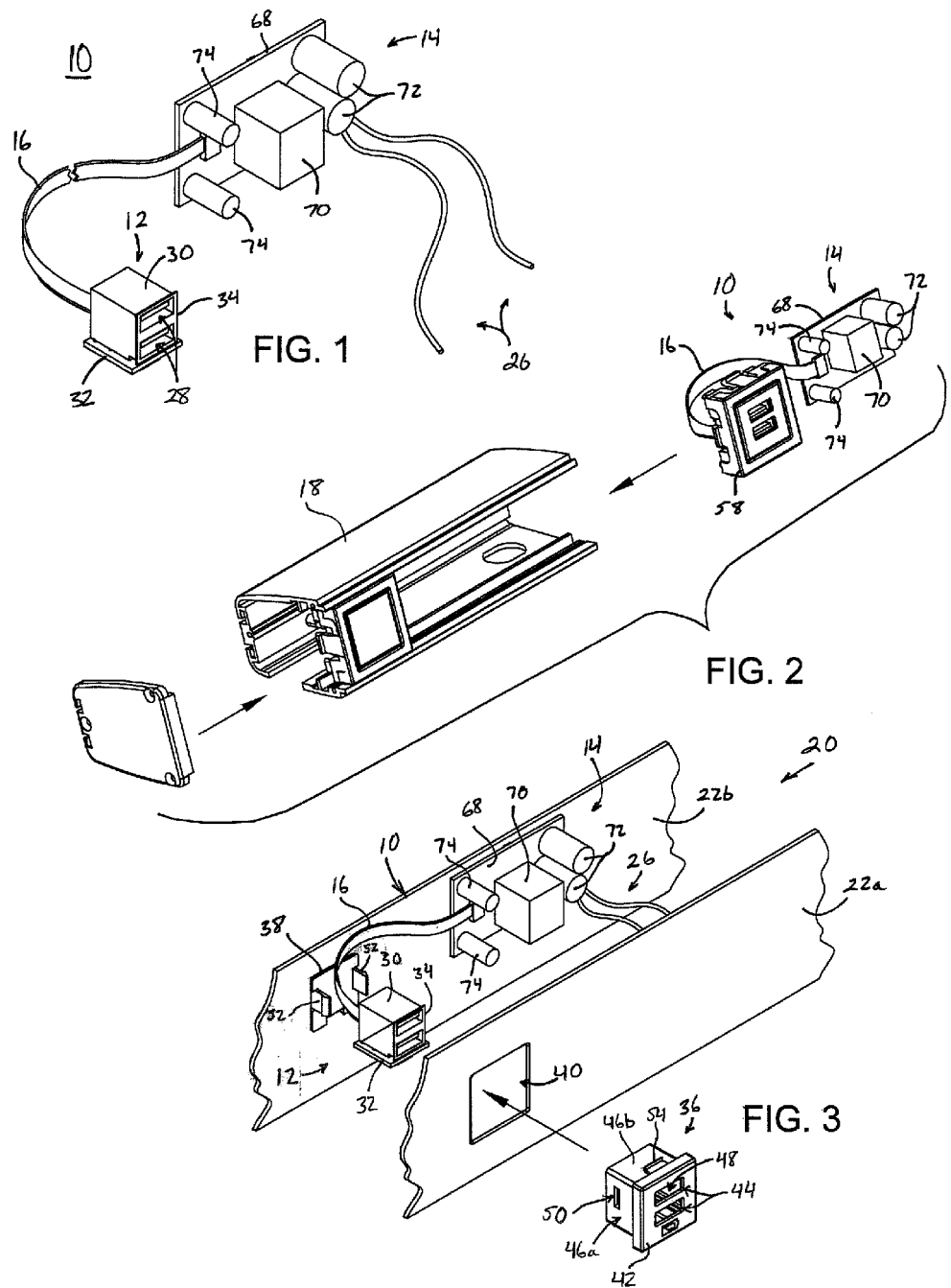

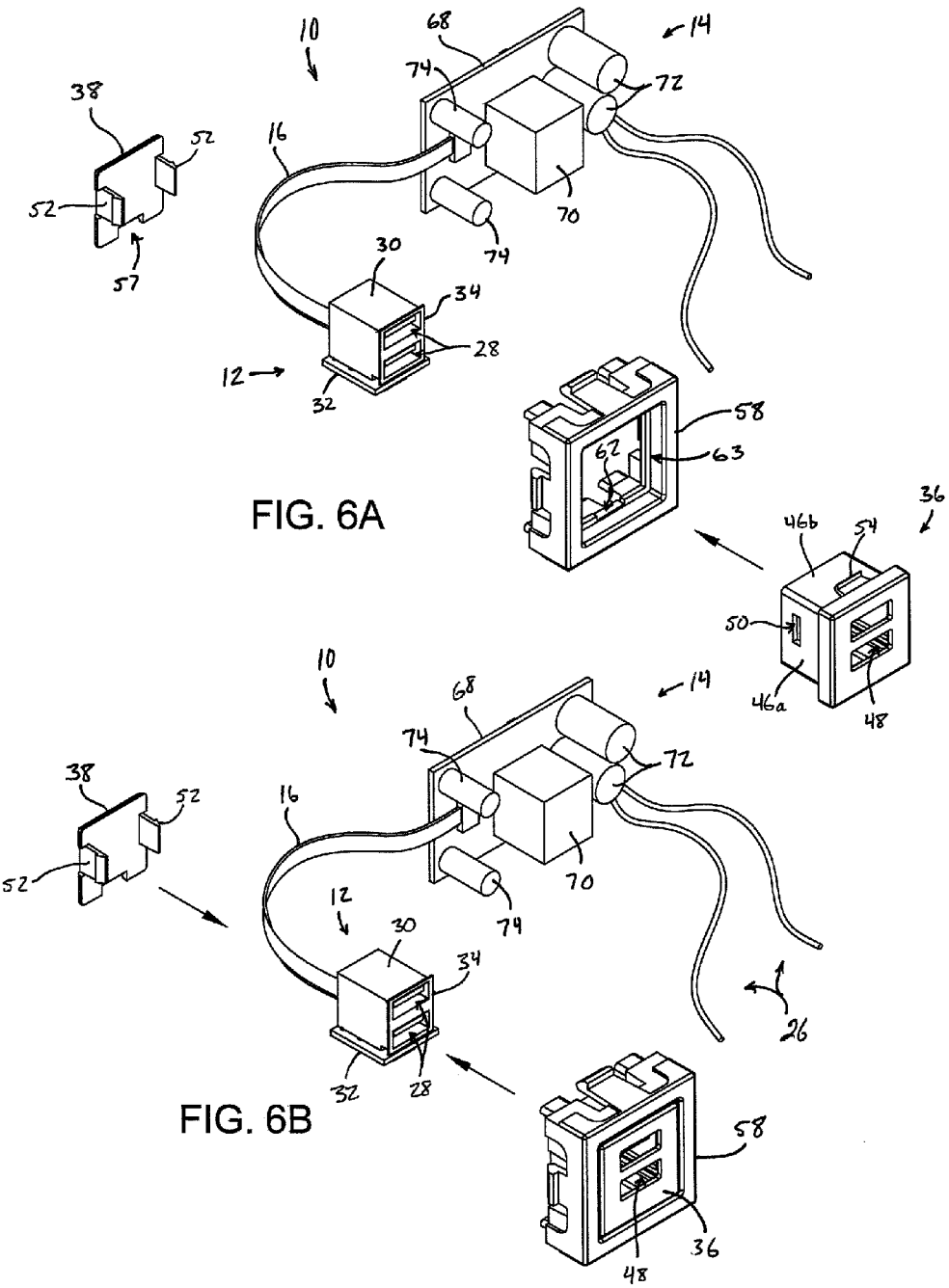

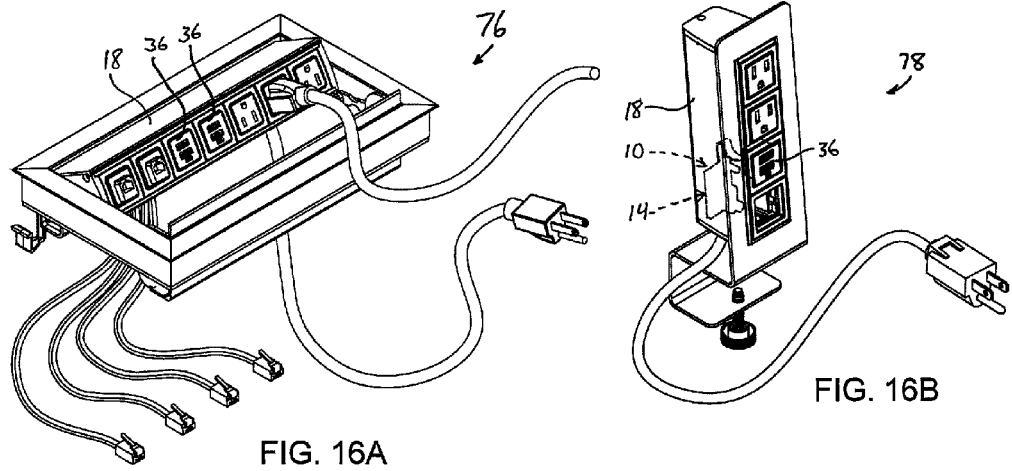
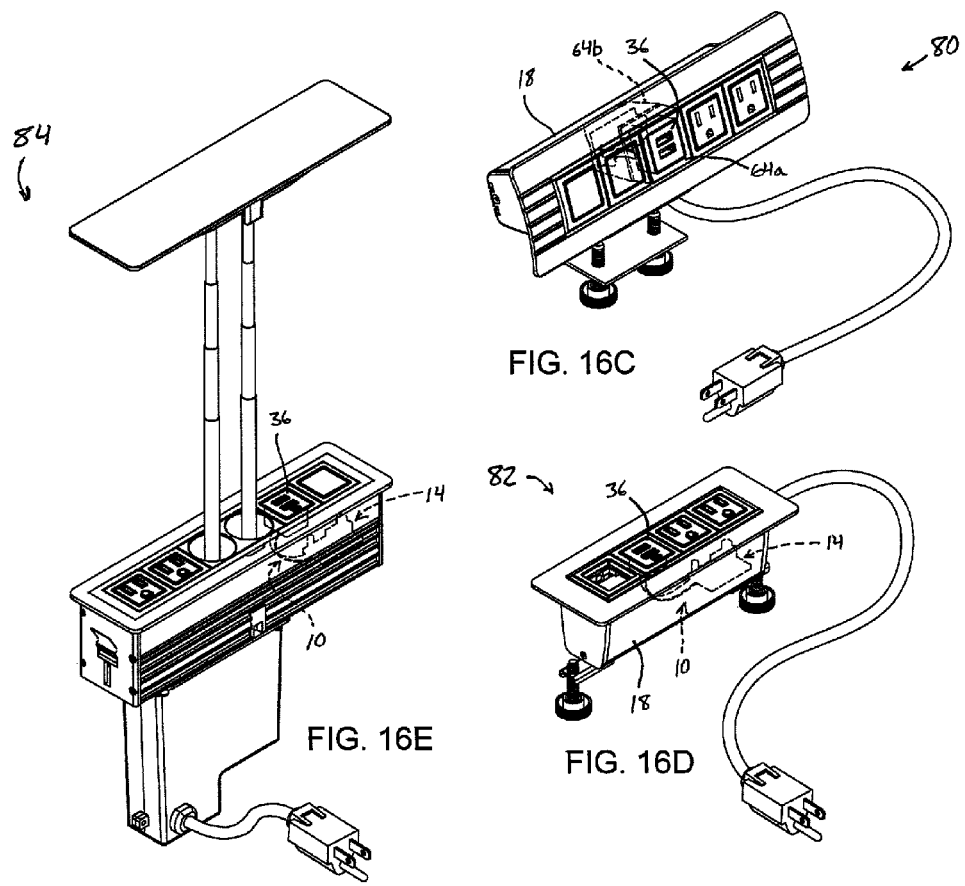

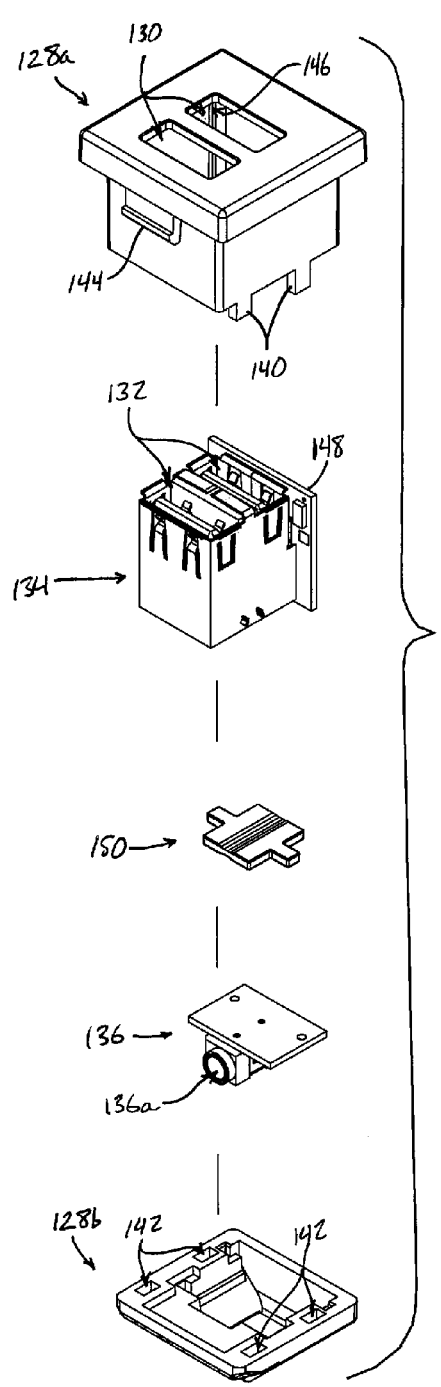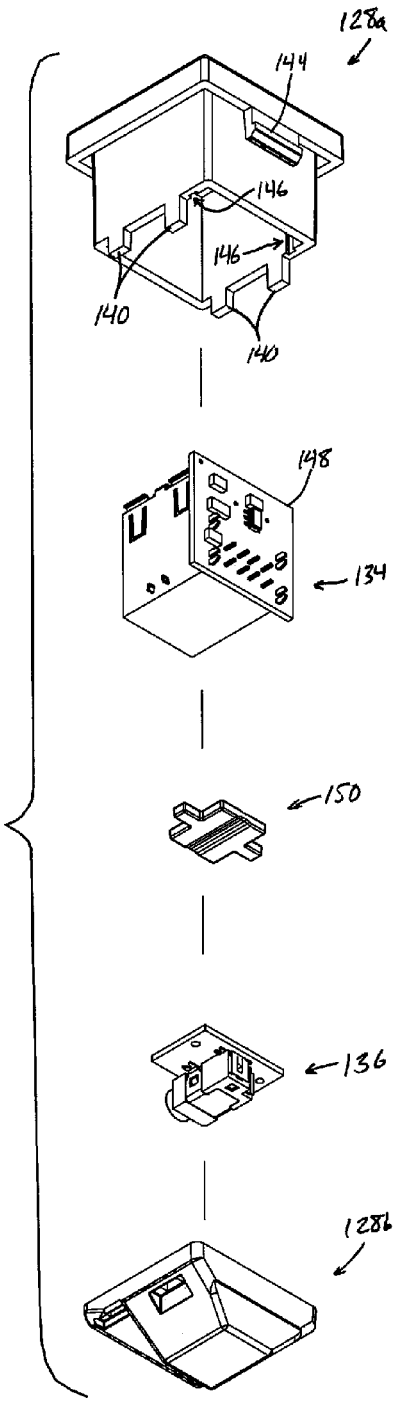

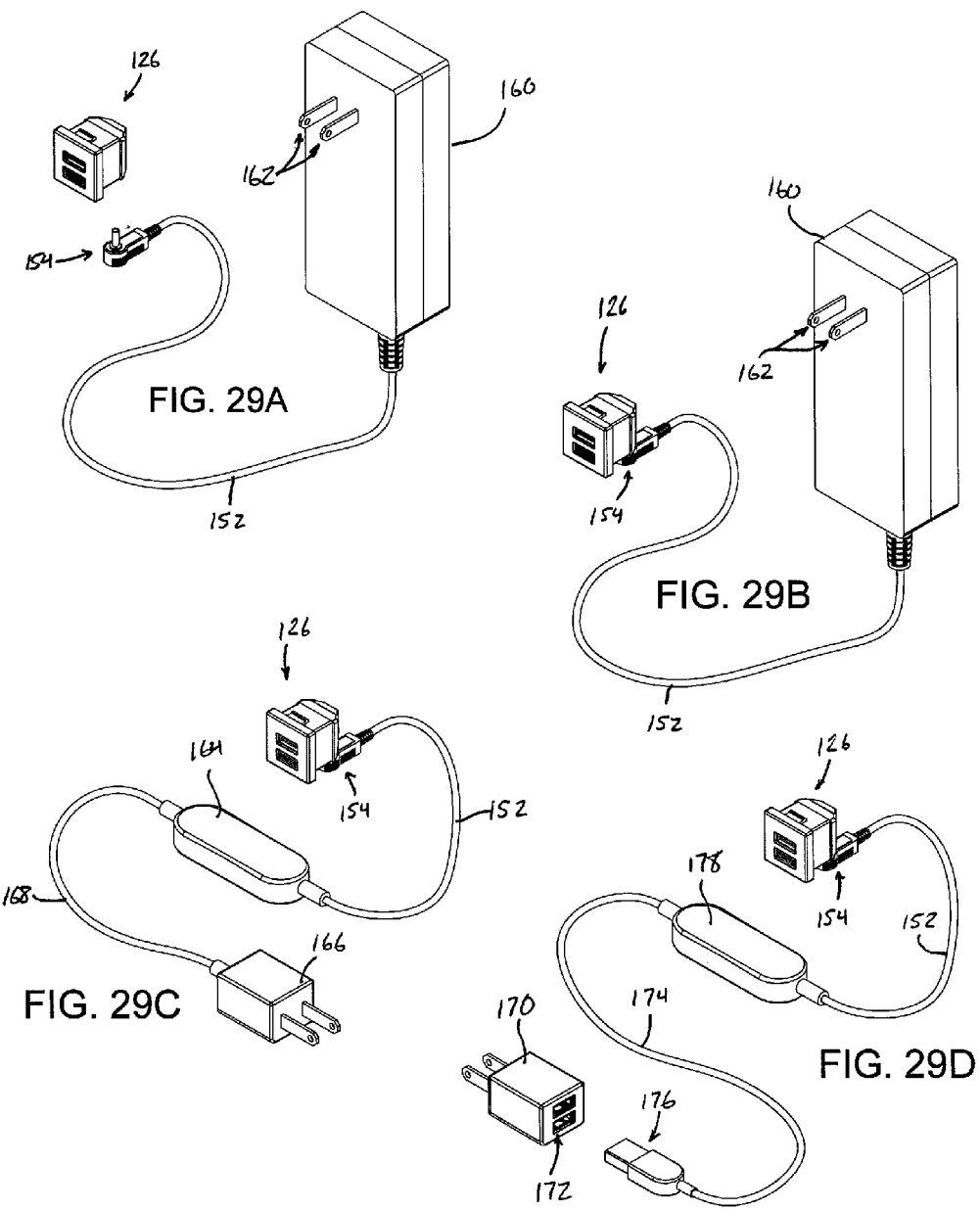

LOW VOLTAGE POWER RECEPTACLE

CROSS REFERENCE TO RELATED APPLICATION

The present application claims the benefit of U.S. provisional application Ser. No. 61/830,239, filed Jun. 3, 2013, which is hereby incorporated herein by reference in its entirety.

FIELD OF THE INVENTION

The present invention relates to low voltage electrical power and/or data outlets or receptacles for use in work areas or the like.

BACKGROUND OF THE INVENTION

Low voltage power and data outlets, such as USB and USB Power outlets, are in increasing demand as the number of electrical and electronic devices that use such outlets continues to increase. Such devices may include, for example, mobile phones, computers and computing devices, digital cameras, communications equipment, and the like. Therefore, there has been increasing demand for access to such outlets in work areas, homes, and even public spaces such as airports, shopping malls, and the like.

SUMMARY OF THE INVENTION

The present invention provides a low voltage power receptacle assembly that, in some embodiments, utilizes a remotely-located circuit, allowing for a receptacle portion that is particularly compact and configured for placement in various locations in which packaging space is limited in the area where the power receptacles are desired. The low voltage power receptacle assembly includes a power transformer for reducing a line voltage (e.g., 110V AC or 220V AC), that supplies electrical power to standard receptacle outlets, down to a lower voltage (such as about 2V DC to about 12V DC, for example), which is made available to users at a low voltage power receptacle, such as a USB-style power receptacle. The low voltage power receptacle assembly's circuit, which is spaced from the receptacles, converts or transforms standard line voltage to a lower voltage power output for use by low voltage power consumers such as phones, computers, cameras, hand-held electronic devices, and the like.

According to one form of the present invention, a low voltage power receptacle assembly includes a circuit subassembly, electrical input conductors, electrical output conductors, and a remote low voltage power receptacle that is spaced from the circuit subassembly and mounted in a user-accessible location. The circuit subassembly is operable to transform a line voltage input to a lower voltage output. The electrical input conductors are coupled to the circuit subassembly and are configured to receive and convey the line voltage from a power source to the circuit subassembly. The electrical output conductors are coupled to the remote low voltage power receptacle and to the circuit subassembly, and convey the lower voltage output from the circuit subassembly to the remotely located low voltage power receptacle.

In one aspect, the receptacle assembly further includes a receptacle housing that receives and supports the remote low voltage power receptacle in the user-accessible location. Optionally, the receptacle housing is configured to slidably engage an elongate channel member of a power or data assembly.

In another aspect, the receptacle housing includes a rear housing portion that defines a substantially enclosed space and supports the circuit subassembly therein.

In yet another aspect, the receptacle assembly further includes a receptacle housing with a first housing portion for receiving and supporting the remote low voltage power receptacle in the user-accessible location, and the receptacle housing further has a second housing portion defining a substantially enclosed space and configured to support the circuit subassembly therein.

In still another aspect, the receptacle assembly includes a faceplate that is coupled to the remote low voltage power receptacle. The faceplate defines at least one opening to provide access to the remote low voltage power receptacle by an electrical plug. Optionally, the faceplate is releasably coupled to a substantially planar mounting surface at an opening formed therein. Optionally, a backing plate is provided to secure the remote low voltage power receptacle to the faceplate.

In a further aspect, the receptacle assembly further includes a receptacle housing defining an opening. The receptacle housing receives the faceplate and the remote low voltage power receptacle with the faceplate positioned in the opening. Optionally, the receptacle housing is configured to slidably engage an elongate channel member of a power or data assembly.

In a still further aspect, the receptacle housing is configured for mounting along a work surface.

In another aspect, the receptacle assembly is in combination with at a power or data center such as a pop-up worksurface-mounted center, an edge-mounted center, a hole-mounted center, and a center with lighting.

In a further aspect, the line voltage is about 110V AC or about 220V AC, and the lower voltage output at the remote low voltage power receptacle is about 2V DC to about 12V DC. Optionally, the remote low voltage power receptacle is a USB-style receptacle.

According to another form of the present invention, a low voltage power receptacle assembly includes a housing, a base plate, and a low voltage power receptacle. The housing defines a power output opening and also has a pair of elongate supports extending along respective interior surfaces of the housing. The base plate has opposite side edge regions for engagement with the elongate supports of the housing. The low voltage power receptacle is coupled to the base plate and is accessible through the power output opening. The low voltage power receptacle is in electrical communication with a circuit subassembly that is operable to transform a line voltage input to a lower voltage output. The low voltage power receptacle is mountable in the housing via sliding engagement of the opposite side regions of the base plate with respective elongate supports.

In one aspect, the housing includes a pair of opposite sidewalls and at least one interior wall located between the sidewalls. Optionally, a first of the elongate supports is a groove formed along a first side of the interior wall, and a second of the elongate supports is a groove formed along a first of the sidewalls. Optionally, a third of the elongate supports is a groove formed along a second side of the interior wall, and a fourth of the elongate supports is a groove formed along a second of the sidewalls.

In another aspect, the housing has first and second housing portions, the first housing portion forming the power output opening and the second housing portion forming the sidewalls, the interior wall, and the elongate supports. Optionally, the receptacle subassembly further includes the circuit subassembly, which is mounted to the base plate.

In still another aspect, the receptacle assembly includes a low voltage input receptacle that is in electrical communication with the low voltage power receptacle. The housing defines a power input opening aligned with the low voltage input receptacle, and the circuit subassembly is located outside of the housing.

In a further aspect, the housing includes first and second housing portions, the first housing portion forming the power output opening and the second housing portion forming the power input opening. The first housing portion includes a pair of projections configured to engage respective surfaces defining an opening in an electrical power center.

Thus, the low voltage power receptacle assembly of the present invention provides convenient access to low voltage power in compact spaces, since the circuitry associated with the receptacle can be mounted in a location that is remote from the receptacles. The receptacles may be used for charging and/or providing power to low voltage consumers, such as mobile phones, computers, and computing devices, digital cameras, media players, communications equipment, etc, and may be mounted in different types or styles of housings, faceplates, or the like, to provide user access.

These and other objects, advantages, purposes and features of the present invention will become apparent upon review of the following specification in conjunction with the drawings.

BRIEF DESCRIPTION OF THE DRAWINGS

FIG. 1 is a perspective view of a low voltage power receptacle assembly in accordance with the present invention;

FIG. 2 is a partially-exploded perspective view of a portion of a power and/or data center including the low voltage power receptacle assembly of FIG. 1;

FIG. 3 is a partially-exploded perspective view of a raceway including the low voltage power receptacle assembly of FIG. 1;

FIGS. 6A-6D are perspective views depicting assembly steps for the low voltage power receptacle of FIG. 2;

FIG. 16A-16E are perspective views of various different worksurface-mountable power and/or data centers, each incorporating a low voltage power receptacle assembly in accordance with the present invention;

FIG. 24 is an exploded top perspective view of the low voltage power receptacle assembly of FIG. 20;

FIG. 25 is an exploded bottom perspective view of the low voltage power receptacle assembly of FIG. 20;

FIGS. 29A-29D are perspective views showing different power supply options for the low voltage power receptacle assembly.

DESCRIPTION OF THE PREFERRED EMBODIMENTS

A low voltage power receptacle assembly includes a circuit for converting a high voltage supply power to a low voltage output at a power receptacle mounted in the same housing as the circuit, or at a remotely-located power receptacle. In cases of a remotely-located power receptacle in particular, the receptacle portion can be made particularly compact and can provide one or more low voltage charging or power ports in various types of housings or other locations that provide convenient user access. As will be described in more detail below, the power receptacle is electrically coupled to the circuit via a power output conductor (typically flexible insulated wiring) of substantially any desired length, and can be mounted in various different faceplates, housings, or other mounting arrangements. This allows low voltage power to be provided in compact locations, and substantially wherever higher voltage power is supplied.

Figure 4A:
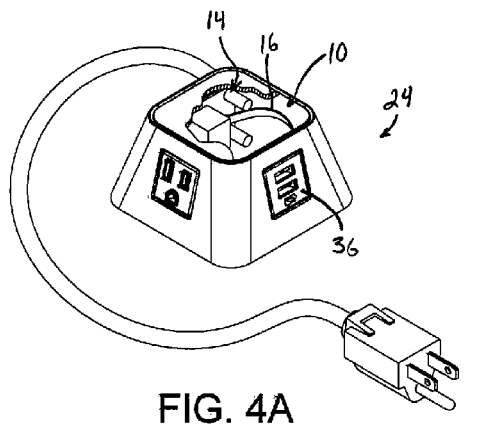
FIG. 4A is a perspective and partial-cutaway view of a table-top power center including the low voltage power receptacle assembly of FIG. 1.
Figure 4B:
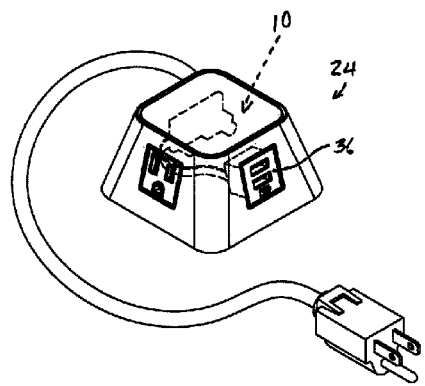
FIG. 4B is another perspective view of the table-top power center of FIG. 4A, with portions of the low voltage power receptacle assembly shown in phantom.

Referring now to the drawings and the illustrative embodiments depicted therein, a low voltage power receptacle assembly 10 includes a receptacle subassembly 12 that is electrically coupled to a circuit subassembly 14 via electrical output conductors 16, which may typically be made up of two or more flexible wires, a ribbon cable, or the like (FIG. 1). Using various faceplates, housings, mounting surfaces, and the like, as will be described in more detail below, receptacle assembly 10 can be adapted for installation in various arrangements and locations such as, for example, a power and/or data center utilizing an elongate channel member 18 (FIGS. 2, 5, 7A, 7B, and 16A-16D), a raceway 20 defined between at least two wall members 22a, 22b (FIG. 3), and a table-top power and/or data center 24 (FIGS. 4A and 4B).

Circuit subassembly 14 converts or transforms a line voltage input received from electrical input conductors 26 (FIG. 1) to a lower voltage output that is supplied to receptacle subassembly 12 by electrical output conductors 16. Electrical output conductors 16 may be substantially any desired length, so that receptacle subassembly 12 may be positioned at substantially any desired distance away from circuit subassembly 14. By separating receptacle subassembly 12 from circuit subassembly 14, the receptacle subassembly 12 can be made particularly compact, so that it can be mounted in many different locations, including those having little space available for additional components or structure.

Receptacle subassembly 12 includes two low voltage electrical receptacles 28 which, in the illustrated embodiment, are configured as Type A USB charging or power ports (FIG. 1) without data capability. However it will be appreciated that substantially any type or configuration of port or receptacle may be used, without departing from the spirit and scope of the present invention. For example, the charging or power ports may further provide data and/or voice transmission capability via digital or analog signals transmitted through additional conductors and terminals that are provided for that purpose. It will further be appreciated that the receptacle subassembly may have as few as one low voltage electrical receptacle, or may have three or more of such receptacles, including two or more different styles of receptacle at a single receptacle assembly. Low voltage electrical receptacles 28 are mounted in a receptacle housing 30 that is generally cubical in shape, with a bottom flange or plate 32 that extends outwardly to the sides from the generally cubical portion of housing 30, and with a front flange or plate 34 that has slightly greater dimensions so as to also extend slightly outwardly from the generally cubical portion of housing 30 (FIG. 1).

Bottom flange 32 and front flange 34 are used in mounting receptacle subassembly 12 in various receptacle housings that may be used for mounting receptacle subassembly 12 in various locations or styles of mounting. For example, and with reference to FIG. 3, a faceplate housing 36 a backing plate 38 may be used to secure receptacle subassembly 12 in a generally square opening 40 that is formed or established in a first wall member 22a that defines a portion of raceway 20, which may be part of a wall, a workspace divider, or the like. This arrangement allows circuit subassembly 14 to be positioned substantially anywhere in raceway 20, such as along a second wall member 22b that is in substantially parallel spaced arrangement with first wall member 22a.

Figure 9:
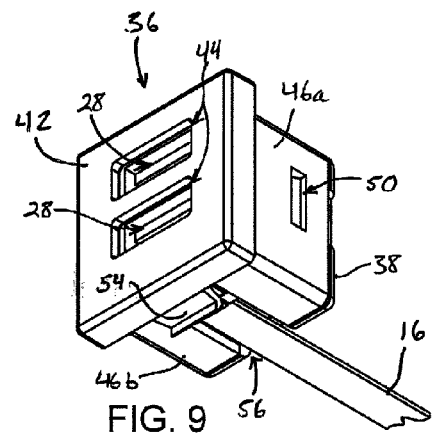
FIG. 9 is another front perspective view of the receptacle subassembly of FIG. 8, taken from below-left.
Figure 10:
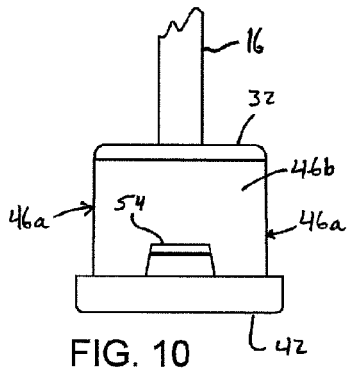
FIG. 10 is a top plan view of the receptacle subassembly of FIG. 8.
Figure 11:
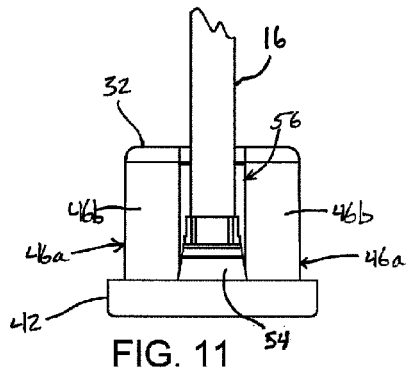
FIG. 11 is a bottom plan view of the receptacle subassembly of FIG. 8.
Figure 12:
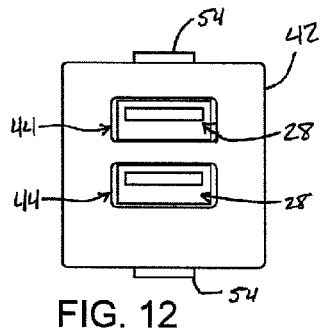
FIG. 12 is a front elevation of the receptacle subassembly of FIG. 8.
Figure 13:
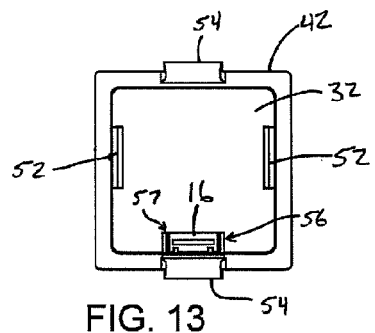
FIG. 13 is a rear elevation of the receptacle subassembly of FIG. 8.
Figure 14:
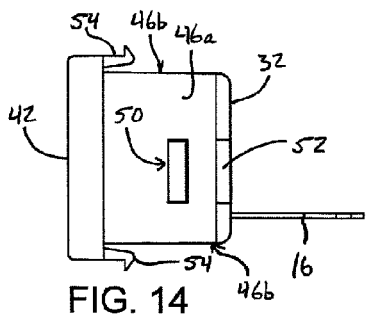
FIG. 14 is a left side elevation of the receptacle subassembly of FIG. 8.
Figure 15:
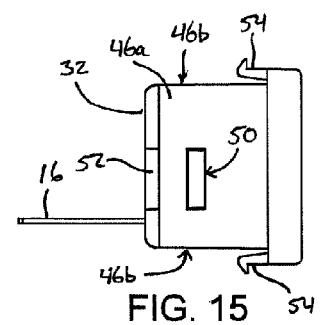
FIG. 15 is a right side elevation of the receptacle subassembly of FIG. 8.

Faceplate housing 36 has a generally square front face portion 42 defining two generally rectangular openings 44 that are sized and aligned to provide access to electrical receptacles 28 when receptacle subassembly 12 is received in faceplate housing 36. Front face portion 42 may have dimensions of approximately 1 inch square, for example, although other dimensions and/or shapes are also envisioned. Faceplate housing 36 further includes four rearwardly-projecting walls, including a pair of sidewalls 46a and top and bottom walls 46b, which cooperate to define a cavity that receives receptacle subassembly 12. The inner dimensions of the cavity formed by sidewalls 46a, top and bottom walls 46b, and front face portion 42 are slightly larger than those of front flange 34, while sidewalls 46a each have elongate slots or grooves 48 formed along their inner surfaces (FIGS. 3, 6A, and 6B). Slots 48 slidably receive the respective projecting sides of bottom flange 32 of receptacle subassembly 12 during insertion of the receptacle subassembly into the cavity of faceplate housing 36, which helps to secure the subassembly and maintain alignment of electrical receptacles 28 with the openings 44 in front face portion 42. Each sidewall 46a defines an opening 50 for receiving a respective forwardly-projecting latch-tab 52 of backing plate 38, such as shown in FIGS. 3, 6A, 6B, and 8-15). Faceplate housing 36 further includes a projection such as a latch-tab 54 adjacent each of the top and bottom walls 46b, which are used to secure or mount faceplate housing 36 to other surfaces, such as the inner edges of first wall member 22a that define opening 40 (FIG. 3). Bottom wall 46b defines a slot 56 through which electrical output conductors 16 pass when receptacle subassembly 12 is installed in faceplate housing 36, such as shown in FIGS. 9, 11, and 13. Backing plate 38 also defines a notch 57 that aligns with slot 56 where electrical output conductors 16 pass through.

Figure 6C:
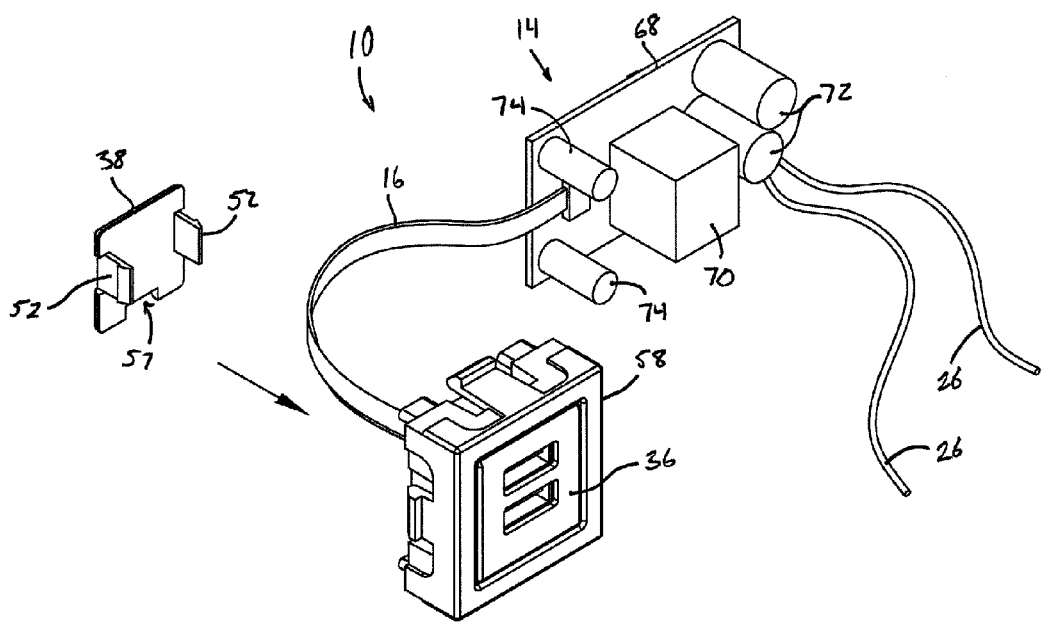
Figure 6D:
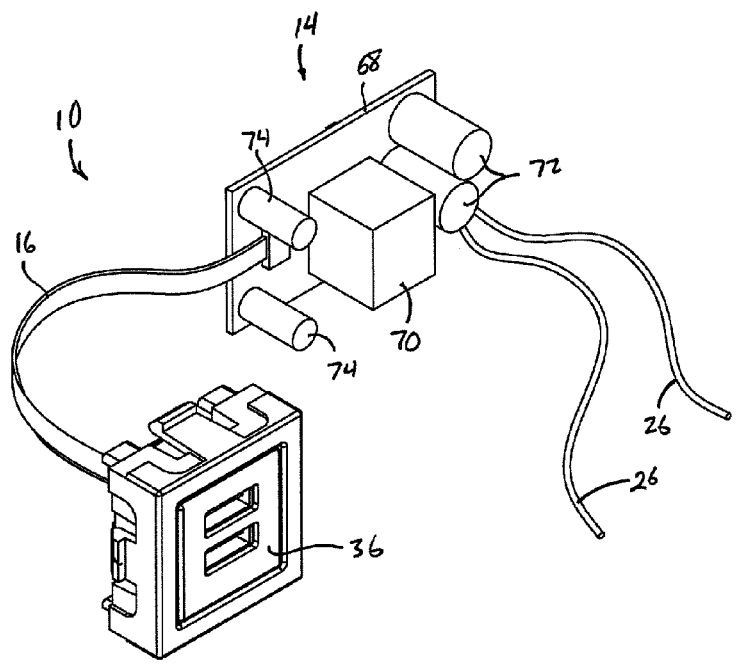
Figure 7A:
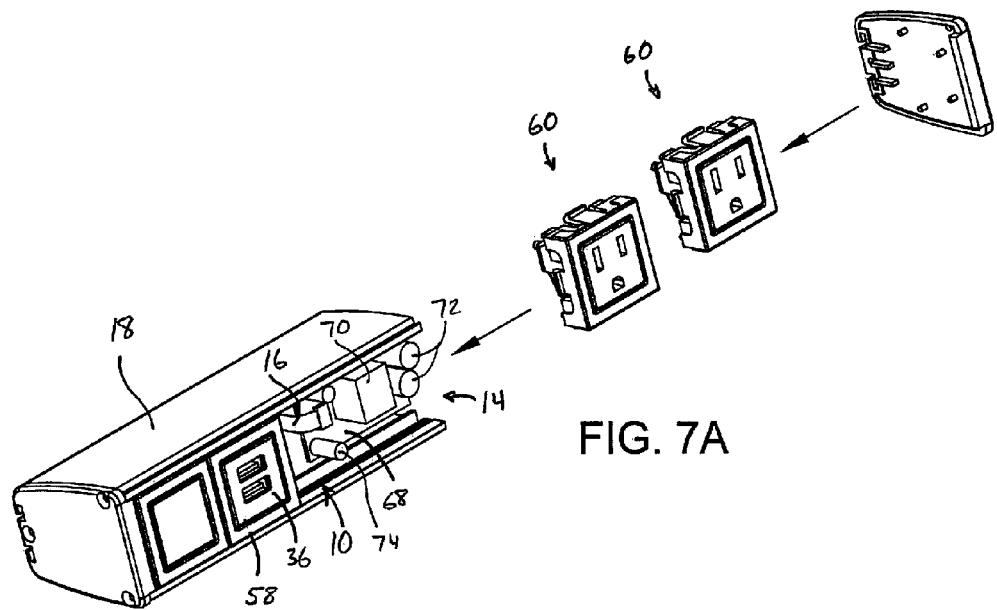
FIG. 7A is a perspective view depicting the further assembly of a power and/or data center corresponding to that of FIG. 2, including the addition of two high voltage power receptacles.
Figure 7B:
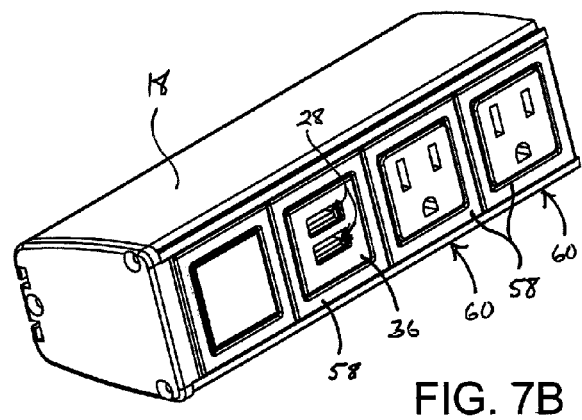
FIG. 7B is a perspective view of the assembled power and/or data center of FIG. 7A, shown assembled.
Figure 8:
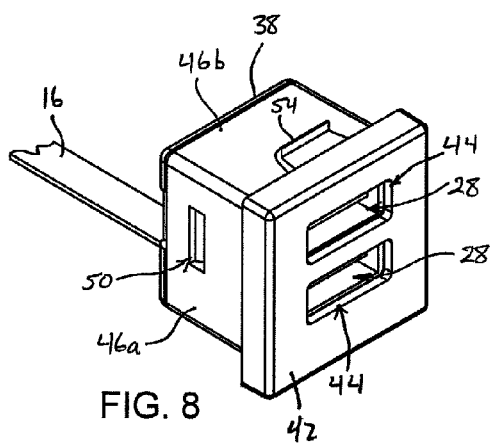
FIG. 8 is a front perspective view of a receptacle subassembly corresponding to the low voltage power receptacle assembly of FIGS. 2 and 6D, taken from above-right.

Although faceplate housing 36 permits receptacle subassembly 12 to be installed or mounted securely in various locations such as shown in FIGS. 3-4B, faceplate housing 36 can also be received in other housings that permit receptacle subassembly and faceplate housing 36 to be installed together in still other ways. For example, and with reference to FIGS. 2 and 6A-6D, faceplate housing 36 can be mounted in a simplex receptacle housing 58 in the manner shown in FIGS. 6A-6D. Simplex receptacle housing 58, in turn, can be slid into engagement with elongate channel member 18, such as in the manner shown in FIGS. 2, 7A, and 7B, in which circuit subassembly 14 is positioned in a space located behind receptacle subassembly 12, or behind other receptacles or components (such as simplex receptacles 60 in FIGS. 7A and 7B). Simplex receptacle housing 58 includes a pair of tab-receiving surfaces 62 (FIG. 6A), which are engaged by latch tabs 54 of faceplate housing 36, which is inserted into an opening 63 formed in housing 58 from a front side thereof, such as shown in FIG. 6A. More detailed descriptions of simplex receptacle housing 58, elongate channel member 18, and other components associated therewith, are found in commonly-owned U.S. Pat. No. 8,444,432 and U.S. Pat. No. 8,480,429, both of which are hereby incorporated herein by reference in their entireties.

Figure 5:
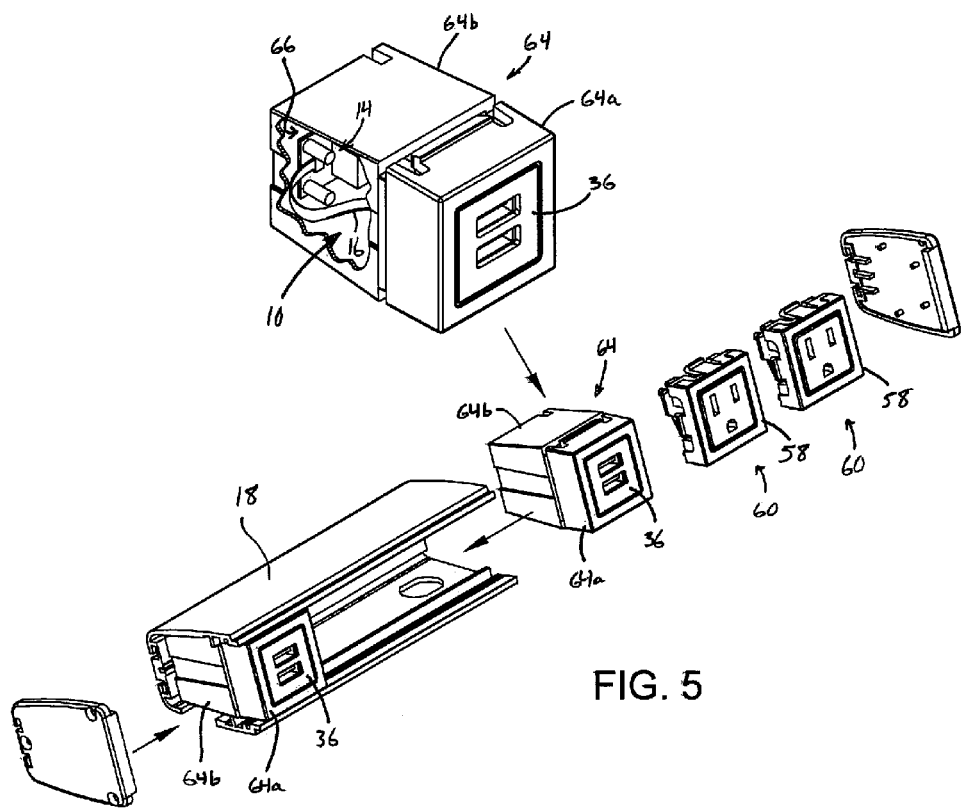
FIG. 5 is a partially-exploded perspective view of a power and/or data center including the low voltage power receptacle assembly of FIG. 1 in a self-contained unit, including an enlarged view of the self-contained unit with portions cut away for clarity.

Optionally, and with reference to FIG. 5, an enclosed receptacle housing 64 includes a front housing portion 64a in which faceplate housing 36 and receptacle subassembly 12 can be mounted, and a rear housing portion 64b that defines a substantially enclosed space 66 in which circuit subassembly 14 can be mounted. Receptacle housing 64 and low voltage power receptacle assembly 10 can therefore be assembled together to form a substantially self-contained low voltage power unit that can be slidably engaged with elongate channel member 18 in substantially the same manner as described above with reference to simplex receptacle housing 58. Electrical input wiring would typically extend out form rear portion 64b of enclosed receptacle housing 64, and would be electrically coupled to an electrical power source, typically 110V AC or 220V AC, which may also supply electrical current to simplex receptacles 60 along the same elongate channel member 18.

In the illustrated embodiments of FIGS. 1-16D, circuit subassembly 14 includes a substantially planar base 68 to which various electrical components are mounted, including electrical contacts, electrical input conductors 26, and electrical output conductors 16 (FIG. 1). Also mounted to base 68 is a low voltage switching power supply transformer 70, power input capacitors 72, and power output capacitors 74. Electrical input conductors 26 bring high voltage electrical power (typically 110V AC or 220V AC current) to low voltage transformer 70 from an electrical power source. From the input conductors 26, the high voltage power is passed through power input capacitors 72, which filter the high voltage power before passing it along to low voltage switching power supply transformer 70. Transformer 70 is operable to transform the high voltage power input to an unfiltered low voltage output, such as about 2V DC to about 12V DC. The unfiltered low voltage output is then passed through power output capacitors 74, which are operable to filter the power from transformer 70 and supply the filtered low voltage power output to low voltage receptacle subassembly 12, where users may access the low voltage power by coupling a cable or device to one of electrical receptacles 28. In the illustrated embodiment, transformer 70 is configured as a USB switching power supply transformer with a low voltage output of about 5V DC, although it will be appreciated that substantially any suitable electrical transformer may be used, without departing from the spirit and scope of the present invention.

Referring now to FIGS. 16A-16E, it will be appreciated that simplex receptacle housing 58 and enclosed receptacle housing 64 can be used for mounting low voltage power receptacle assembly 10 in various different power and/or data centers or assemblies that are configured for use at, along, or near a work surface such as a table, a desk, a divider wall, a floor surface, a ceiling, or the like. For example, one or more low voltage power receptacle assemblies may be included in a retractable or "pop-up" power and data center 76 (FIG. 16A), in a vertically-oriented edge-clamped power and/or data center 78 (FIG. 16B), in a horizontally-oriented edge-clamped power and/or data center 80 (FIG. 16C), in a hole-mounted power and/or data center 82 (FIG. 16D), and in a power and/or data center with lighting 84 (FIG. 16E). The aforementioned power and/or data centers or assemblies may be more fully understood with reference to commonly-owned U.S. Pat. No. 8,721,124, U.S. Pat. No. 8,444,432, U.S. Pat. No. 8,287,292, U.S. Pat. No. 8,172,604, and U.S. Pat. No. 7,736,178, all of which are hereby incorporated herein by reference in their entireties.

Figure 17:
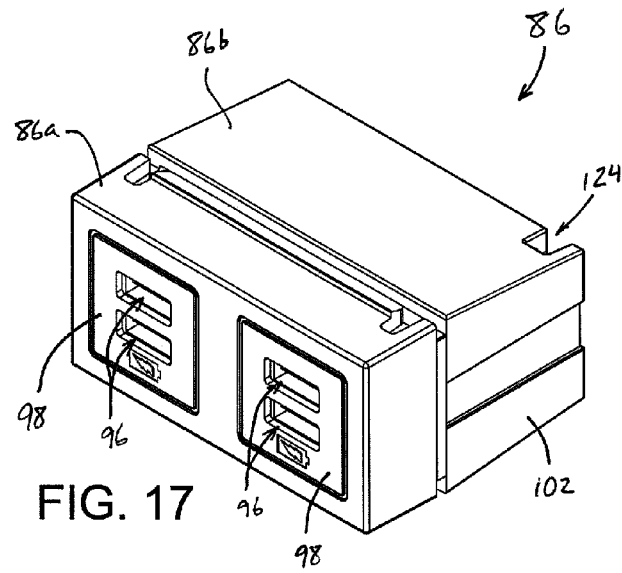
FIG. 17 is a perspective view of a four-port low voltage power receptacle assembly in accordance with the present invention.
Figure 18:
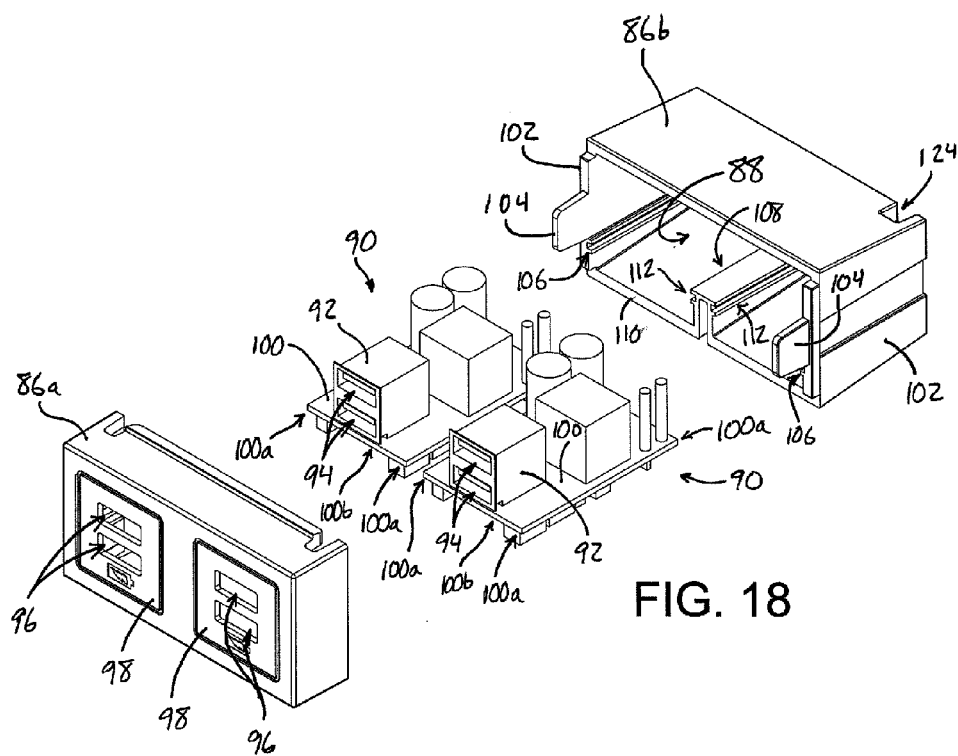
FIG. 18 is an exploded perspective view of the four-port low voltage power receptacle assembly of FIG. 17.
Figure 19:
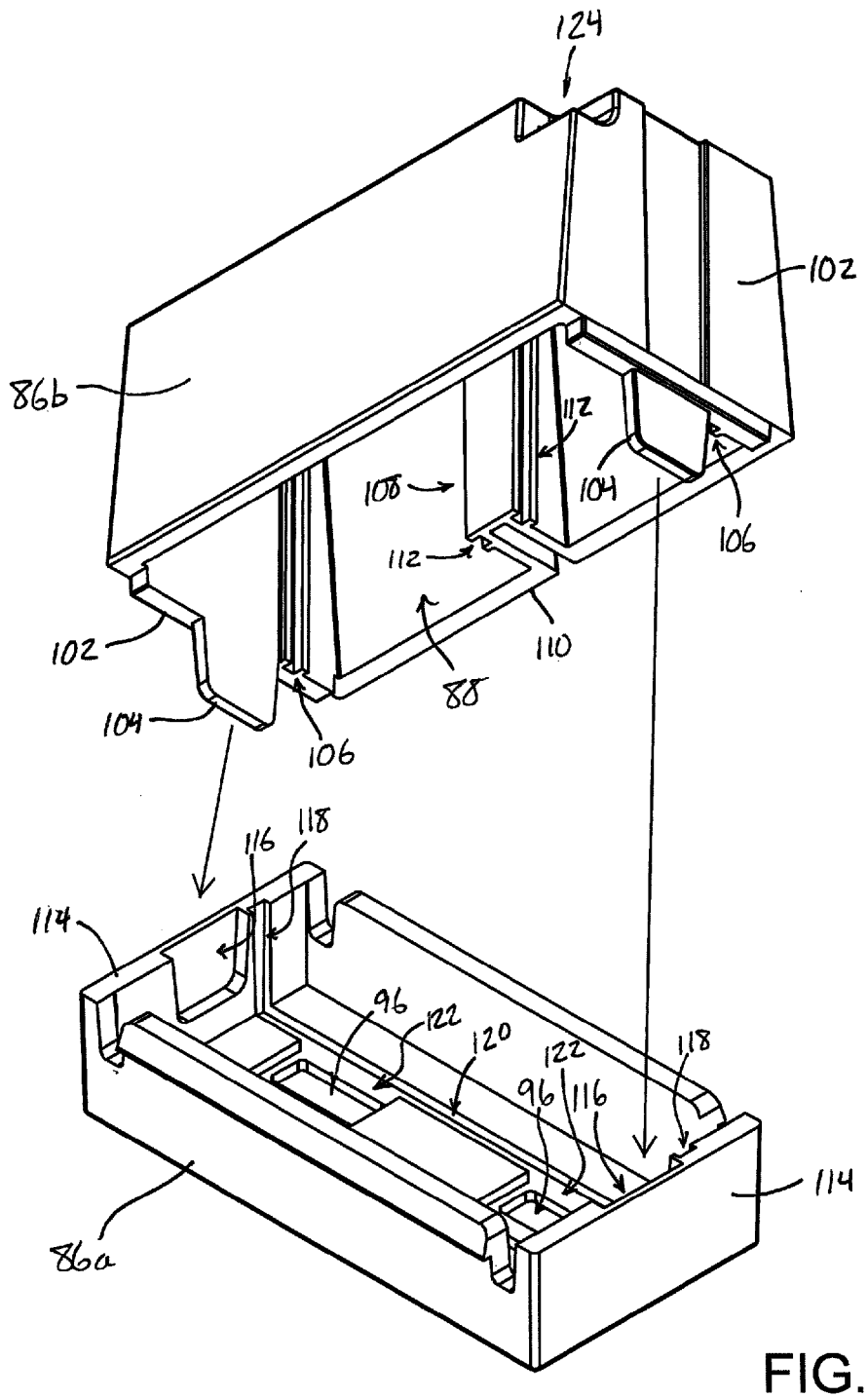
FIG. 19 is an exploded perspective view of the front and rear housings of the four-port low voltage power receptacle assembly of FIG. 17.

Optionally, and with reference to FIGS. 17-19, another enclosed receptacle housing 86 includes a front housing portion 86a and a rear housing portion 86b that cooperate to define a substantially enclosed space 88 in which a pair of circuit assemblies 90 are mounted. Aside from its increased width, the outer surface configuration of receptacle housing 86 is substantially similar to that of receptacle housing 64, which is described above, such that the installation of receptacle housing 86 at an elongate channel member of a power and/or data center, need not be repeated herein. However, the interior of receptacle housing 86 is shaped to slidingly receive and support two of the circuit assemblies 90, each having a low voltage receptacle subassembly 92 including a pair of low voltage receptacles 94, which align with respective slots or openings 96 that are formed or established in a face plate portion 98 of front housing portion 86a, such as shown in FIGS. 17 and 18.

Circuit assemblies 90 include respective planar bases 100 with side edge regions or portions 100a. Rear housing portion 86b includes a pair of sidewalls 102 with forwardly-projecting tabs 104 and respective a pair of elongate supports in the form of grooves or slots 106 extending along interior surfaces of the sidewalls (FIGS. 18 and 19). A central interior wall 108 extends upwardly part way into space 88 from a lower wall 110 that extends between sidewalls 102, with interior central wall 108 defining respective longitudinal slots 112 on either side thereof. Longitudinal slots 112 are spaced above bottom wall 110 by substantially the same distance as longitudinal slots 106 along sidewalls 102, so that slots 106 are aligned with slots 112 for receiving side edge regions 100a of planar bases 100 of the circuit assemblies 90.

Front housing portion 86a includes a pair of sidewalls 114 having respective interior recesses 116 that are sized and shaped to receive tabs 104 that project forwardly from respective sidewalls 102 of rear housing portion 86b, such as shown in FIG. 19. In addition, sidewalls 114 define respective interior slots 118 that generally align with corresponding ones of the longitudinal slots 106 formed along sidewalls 102, and are configured to receive forward end portions of the side edge regions 100a of the planar bases 100 of circuit assemblies 90. A lateral interior slot 120 extends between forward ends of interior slots 118, and receives respective forward edge regions 100b of planar bases 100. Lateral slot 120 is opened to respective recessed regions 122 in the vicinity of each pair of slots 96, such as shown in FIG. 19. Recessed regions 122 receive forward end portions of the respective low voltage receptacle subassemblies 92 of circuit assemblies 90.

A recessed region 124 at an upper rear corner of rear housing portion 86b defines an opening that receives a pair of high voltage electrical conductors for powering the respective circuit assemblies 90. Housing 86 is configured for sliding insertion into elongate channel member 18 such as in substantially the same manner as that which is depicted for receptacle housing 64 in FIG. 5. In addition, circuit assemblies 90 are electrically configured in a similar manner as circuit subassemblies 14, described above, except that low voltage receptacle subassemblies 92 are mounted directly on planar bases 100 rather than being coupled only by a pair of flexible electrical output conductors.

Figure 20:
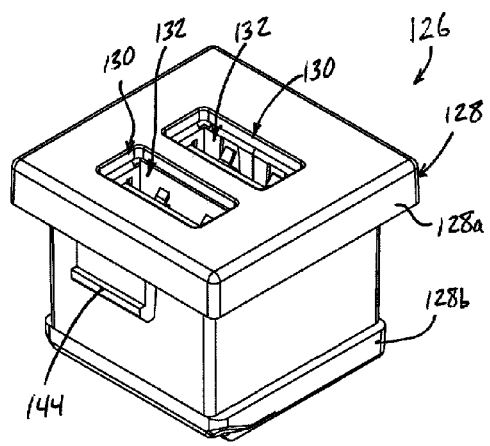
FIG. 20 is a top perspective view of another low voltage power receptacle assembly in accordance with the present invention.
Figure 21:
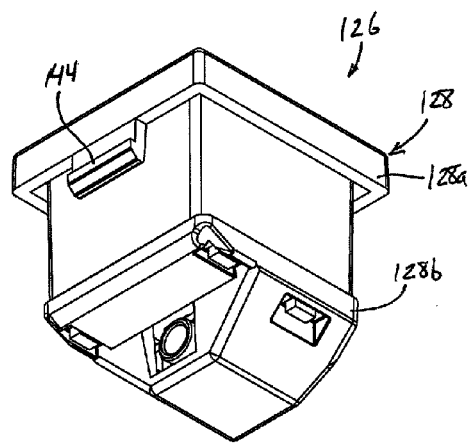
FIG. 21 is a bottom perspective view of the low voltage power receptacle assembly of FIG. 20.
Figure 22:
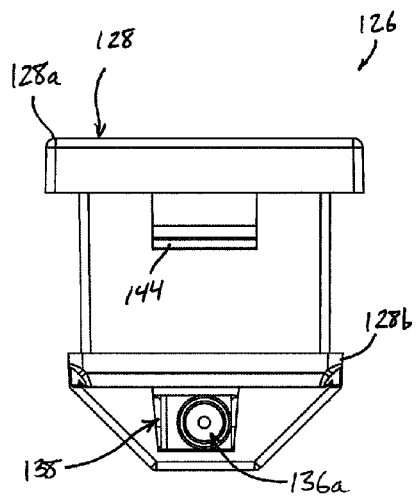
FIG. 22 is a front elevation of the low voltage power receptacle assembly of FIG. 20.
Figure 23:
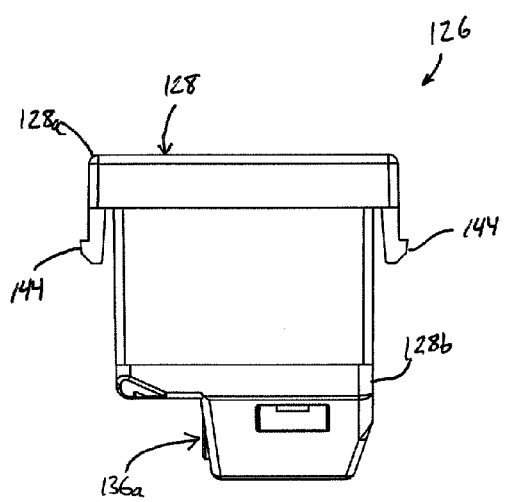
FIG. 23 is a right side elevation of the low voltage power receptacle assembly of FIG. 20.
Figure 26:
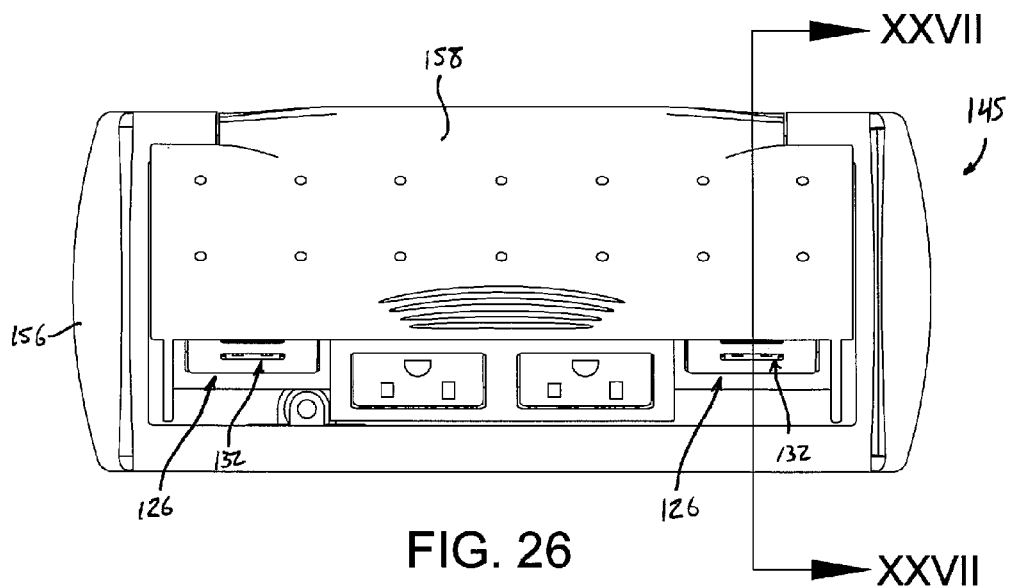
FIG. 26 is a top plan view of a power center incorporating two of the low voltage power receptacle assemblies and two high voltage power receptacle assemblies.

Referring now to FIGS. 20-25, another low voltage power receptacle assembly 126 includes a housing 128 that is adapted for installation along the elongate channel member 18 of a power and/or data unit, and is supplied with low voltage DC power received from a remotely-located circuit, as will be described below in more detail. Housing 128 includes a front housing portion 128a that defines a pair of slots 130 to provide access to respective electrical receptacles 132 of a receptacle subassembly 134 (FIGS. 20 and 24). A rear housing portion 128b attaches to front housing portion 128a, and supports a low voltage input receptacle 136 while providing access to a receptacle opening 136a via an opening 138 formed in the rear housing portion. Rear housing portion 128b couples to front housing portion 128a via a plurality of tabs 140 that extend rearwardly from front housing portion 128a and engage corresponding openings or recesses 142 formed in rear housing portion 128b, such as shown in FIG. 24. Tabs 140 may be secured in openings 142 via ultrasonic welding, adhesives, or the like, which may also be used along the other surfaces of front and rear housing portions 128a, 128b that contact one another. Optionally, resilient latch tabs may be used to secure the housing portions together.

Figures 27A, 27B:
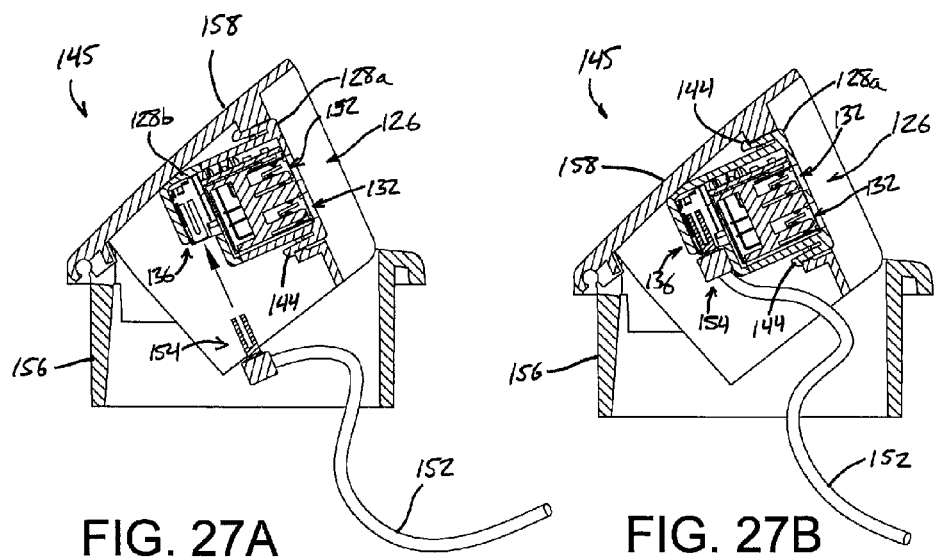
FIG. 27A is a side sectional elevation taken along section line XXVII-XXVII in FIG. 26, depicting the coupling of a power cord to the low voltage power receptacle assembly.
FIG. 27B is another side sectional elevation taken along section line XXVII-XXVII in FIG. 26, and depicting the coupling of a power cord to the low voltage power receptacle assembly.

Front housing portion 128a may have similar outer dimensions and features as faceplate housing 36 described above. For example, front housing portion 128a includes a pair of projections in the form of latch tabs 144 that may be used to secure or mount faceplate housing 36 to other surfaces such as in an electrical power center 145, as shown in FIGS. 27A and 27B. Front housing portion 128a also defines a pair of elongate supports in the form of grooves or slots 146 along opposite interior surfaces thereof, for slidably receiving respective side edge portions of a generally planar flange or plate 148 of receptacle subassembly 134, such as in the manner shown in FIGS. 24 and 25.

When low voltage power receptacle assembly 126 is assembled, side edge portions of plate 148 are received in slots 146 of front housing portion 128a, with low voltage receptacles 132 aligned with slots 130 of front housing portion 128a (FIG. 20). The receptacle opening 136a of low voltage input receptacle 136 is aligned with opening 138 in rear housing portion 128b (FIG. 22), and low voltage input receptacle 136 is in electrical communication with receptacle subassembly 134. Optionally, a non-conducting pad 150 is positioned between receptacle subassembly 134 and low voltage input receptacle 136 (FIGS. 24 and 25), to separate and electrically insulate receptacle subassembly 134 from low voltage input receptacle 136, thereby preventing undesirable contact and possible electrical shorts between conductive elements associated with those components. Pad 150 may be made of resinous plastic or other non-conductive material, and may be made of soft or resilient and compressible material to help ensure that receptacle subassembly 134 and low voltage input receptacle 136 are held tightly against the inner surfaces of housing 128, such as to prevent looseness or rattling, and/or to help cushion any forces that may be applied to receptacles 132.

Low voltage power receptacle assembly 126 is supplied with low voltage DC power via a low voltage electrical cord 152 having a coaxial connector 154 at its distal end, the connector 154 being compatible with low voltage input receptacle 136, such as shown in FIGS. 27A and 27B. Low voltage electrical cord 152 may be routed into a stationary housing 156 of power center 145 and coupled to input receptacle 136, which may pivot between raised and lowered positions with a movable carriage 158 that is pivotably coupled to stationary housing 156. Low voltage electrical cord 152 received low voltage DC power from a DC converter circuit, such as a conventional DC transformer 160 with a pair of prongs 162 for engagement with a conventional high voltage AC power receptacle or the like (FIGS. 28C, 29A, and 29B). Optionally, a DC transformer 164 may be positioned in-line so that a smaller conventional plug 166 may be used, such as shown in FIG. 29C, where a high voltage electrical cord 168 supplies high voltage AC power from plug 166 to transformer 164, which outputs low voltage DC power to low voltage cord 152. Optionally, and with reference to FIG. 29D, a small AC plug 170 with DC transformer and low voltage outlets 172 supplies low voltage DC power to a first low voltage cord 174 via a low voltage plug 176. Low voltage cord 174 supplies power to a converter 178, which supplies DC power to low voltage electrical cord 152, such as at a different voltage than is supplied to cord 174.

Figure 28A:
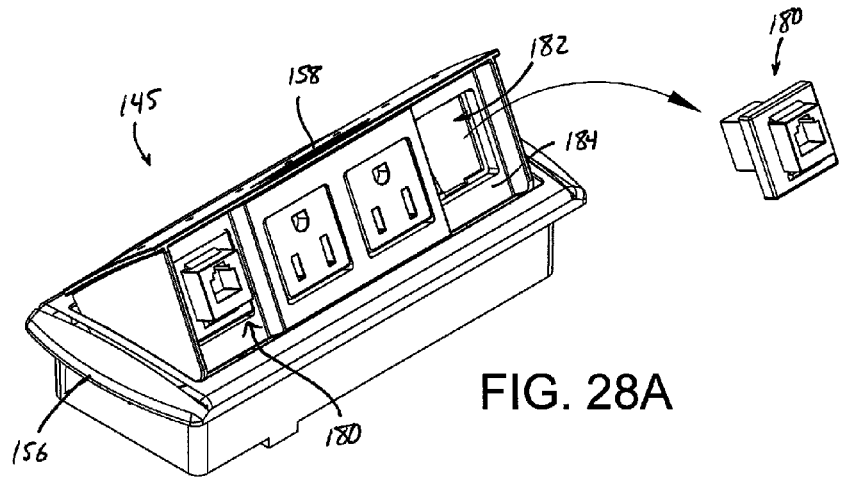
FIGS. 28A-28C are perspective views showing three steps of retrofitting a power and data center with a low voltage power receptacle assembly.
Figure 28B:
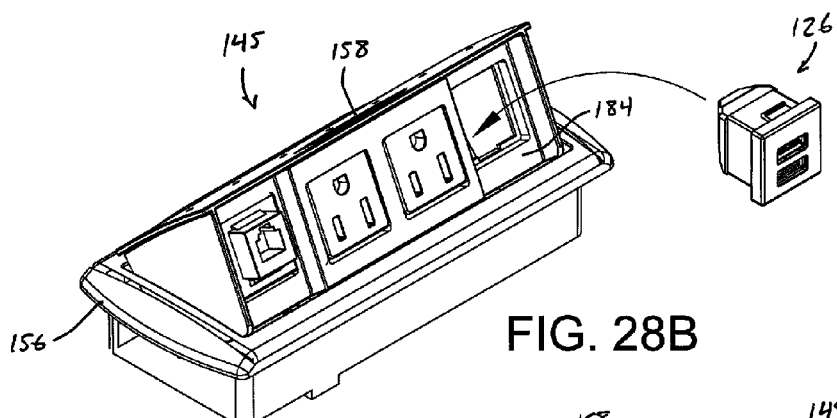
Figure 28C:
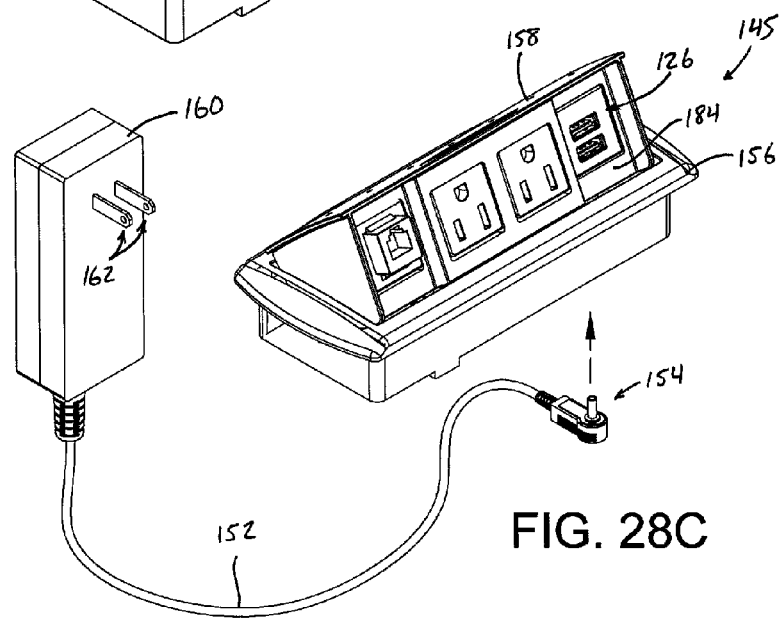

Optionally, and with reference to FIGS. 28A-28C, low voltage power receptacle assembly 126 may be configured as a drop-in replacement for an existing power or data receptacle 180 mounted at an opening 182 formed in a front surface 184 of movable carriage 158 (FIG. 28A). Once any data or power connections to power or data receptacle 180 are disabled, the receptacle 180 is pulled outwardly from opening 182 (FIG. 28A) and low voltage power receptacle assembly 126 is inserted in its place (FIG. 28B) with latch tabs 144 engaging respective upper and lower edge portions of front surface 184 that define portions of opening 182, such as shown in FIGS. 27A and 27B. Then, coaxial connector 154 is connected to low voltage input receptacle 136, DC transformer 160 is plugged into a wall outlet or other power source, and receptacles 132 are energized and ready for use.

Accordingly, the low voltage power receptacle assembly of the present invention provides a low voltage power receptacle assembly that, in some forms, includes a remotely-located circuit subassembly that allows for a receptacle portion or subassembly that is particularly compact and may be placed in various different locations or mounting arrangements. In other arrangements, a power conversion circuit is housed with the low voltage receptacles, such as in a manner that facilitates installation of the low voltage power receptacle assembly as a retrofit to an existing power and/or data unit, or the like. The assembly is particularly well suited for operating environments in which packaging space is limited in the area where the power receptacles are desired. The low voltage power receptacle assembly includes a power transformer, at the circuit subassembly, for reducing a line voltage down to a lower voltage that is suitable for small electronic devices such as mobile phones, media players, hand-held computers, and the like. Thus, low-voltage power and/or charging capability may be provided in locations where only higher voltage power is generally available.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A low voltage power receptacle assembly comprising:
    a housing defining a power output opening and a pair of elongate supports disposed along respective interior surfaces of said housing;
    a base plate having opposite side edge regions;
    a circuit subassembly that is operable to transform a line voltage input to a lower voltage output; and
    a low voltage power output receptacle coupled to said base plate and accessible through said power output opening, wherein said low voltage power output receptacle is in electrical communication with said circuit subassembly;
    wherein said low voltage power output receptacle is mountable in said housing via sliding engagement of said opposite side regions of said base plate with respective ones of said elongate supports.

2. The receptacle assembly of claim 1, wherein said low voltage output power receptacle comprises a USB-style receptacle.

3. The receptacle assembly of claim 1, wherein said housing comprises a pair of opposite sidewalls and at least one interior wall disposed between said sidewalls, and wherein a first of said elongate supports is formed along a first side of said interior wall and a second of said elongate supports is formed along a first of said sidewalls.

4. The receptacle assembly of claim 3, further comprising a third elongate support formed along a second side of said interior wall and a fourth elongate support formed along a second of said sidewalls.

5. The receptacle assembly of claim 4, wherein said housing comprises first and second housing portions, said first housing portion forming said power output opening and said second housing portion forming said sidewalls, said interior wall, and said elongate supports, and wherein said circuit subassembly is mounted to said base plate and is disposed in said second housing portion.

6. The receptacle assembly of claim 1, wherein said circuit subassembly is positioned outside of said housing.

7. The receptacle assembly of claim 6, further comprising a low voltage input receptacle in electrical communication with said low voltage power output receptacle, wherein said housing defines a power input opening aligned with said low voltage input receptacle.

8. The receptacle assembly of claim 7, wherein said housing comprises first and second housing portions, said first housing portion forming said power output opening and said second housing portion forming said power input opening, wherein said first housing portion further comprises a pair of projections configured to engage respective surfaces defining an opening in an electrical power center.

9. The receptacle assembly of claim 8, wherein said first housing portion comprises a pair of latch tabs configured to secure said receptacle assembly in an opening formed in a mounting surface.

10. The receptacle assembly of claim 4, wherein each of said elongate supports comprises an elongate groove.

11. The receptacle assembly of claim 4, further comprising:
 a second power output opening defined in said housing;
 a second base plate having opposite side edge regions;
 a second circuit subassembly that is operable to transform a line voltage input to a lower voltage output; and
 a second low voltage power output receptacle coupled to said second base plate and accessible through said second power output opening, wherein said second low voltage power output receptacle is in electrical communication with said second circuit subassembly;
 wherein said second low voltage power output receptacle is mountable in said housing via sliding engagement of said opposite side regions of said second base plate with respective ones of said third and fourth elongate supports.

12. The receptacle assembly of claim 11, wherein said housing comprises first and second housing portions, said first housing portion forming said power output openings and said second housing portion including said first and second sidewalls and defining said second and fourth elongate supports, wherein said first housing portion further defines a pair of slots that substantially align with respective ones of said second and fourth elongate supports, and wherein each of said slots is configured to receive one of said opposite side edge regions of a respective one of said base plates.

13. The receptacle assembly of claim 12, wherein said first housing portion defines a lateral slot configured to receive respective forward edge regions of said base plates.

14. The receptacle assembly of claim 1, wherein said housing comprises first and second housing portions, said first housing portion forming said power output opening and said second housing portion including a pair of sidewalls that form respective ones of said interior surfaces and said elongate supports, wherein said circuit subassembly is mounted to said base plate and is disposed in said second housing portion.

15. The receptacle assembly of claim 14, further comprising a projecting tab extending forwardly from each of said sidewalls of said second housing portion, wherein said first housing portion defines a pair of recesses at opposite sides thereof, and wherein said projecting tabs are configured to engage respective ones of said recesses upon assembly of said first housing portion to said second housing portion.

* * * * *